United States Patent [19]

Jones et al.

[11] Patent Number: 4,649,428
[45] Date of Patent: Mar. 10, 1987

[54] DIGITAL TV WITH LOW COST AUXILIARY DEVICE COMMUNICATION SYSTEM

[75] Inventors: Gary A. Jones, Arlington Heights, Ill.; Raymond M. Rees, Salem, Wis.; Thomas J. Zato, Palatine, Ill.

[73] Assignee: Zenith Electronics Corporation, Glenview, Ill.

[21] Appl. No.: 746,202

[22] Filed: Jun. 18, 1985

[51] Int. Cl.⁴ .............................................. H04N 5/00
[52] U.S. Cl. ................... 358/188; 358/194.1; 358/903; 455/151; 360/69
[58] Field of Search ............. 358/93, 903, 188, 194.1; 455/5, 6, 151; 360/69

[56] References Cited

U.S. PATENT DOCUMENTS

| | | | |
|---|---|---|---|
| 4,322,854 | 3/1982 | Bundens | 455/6 |
| 4,337,480 | 6/1982 | Bourassin | 358/93 |
| 4,343,042 | 8/1982 | Schrock | 455/5 |
| 4,392,022 | 7/1983 | Carlson | 455/151 |

Primary Examiner—Howard W. Britton

[57] ABSTRACT

A digital TV system includes a CCU that is interconnected by a three-wire, high speed bus to a plurality of TV signal function modules for controlling operation thereof by means of a high speed hardware generated clock signal. A software generated clock signal in the CCU is supplied on a low speed two-wire auxiliary device bus which is connected to microprocessors in a plurality of auxiliary devices for performing functions ancillary to TV signal processing. The microprocessor in each auxiliary device is an off-the-shelf type that does not require any special hardware because the timing on the auxiliary device bus is sufficiently slow to enable software monitoring of the line and data transfer.

8 Claims, 1 Drawing Figure

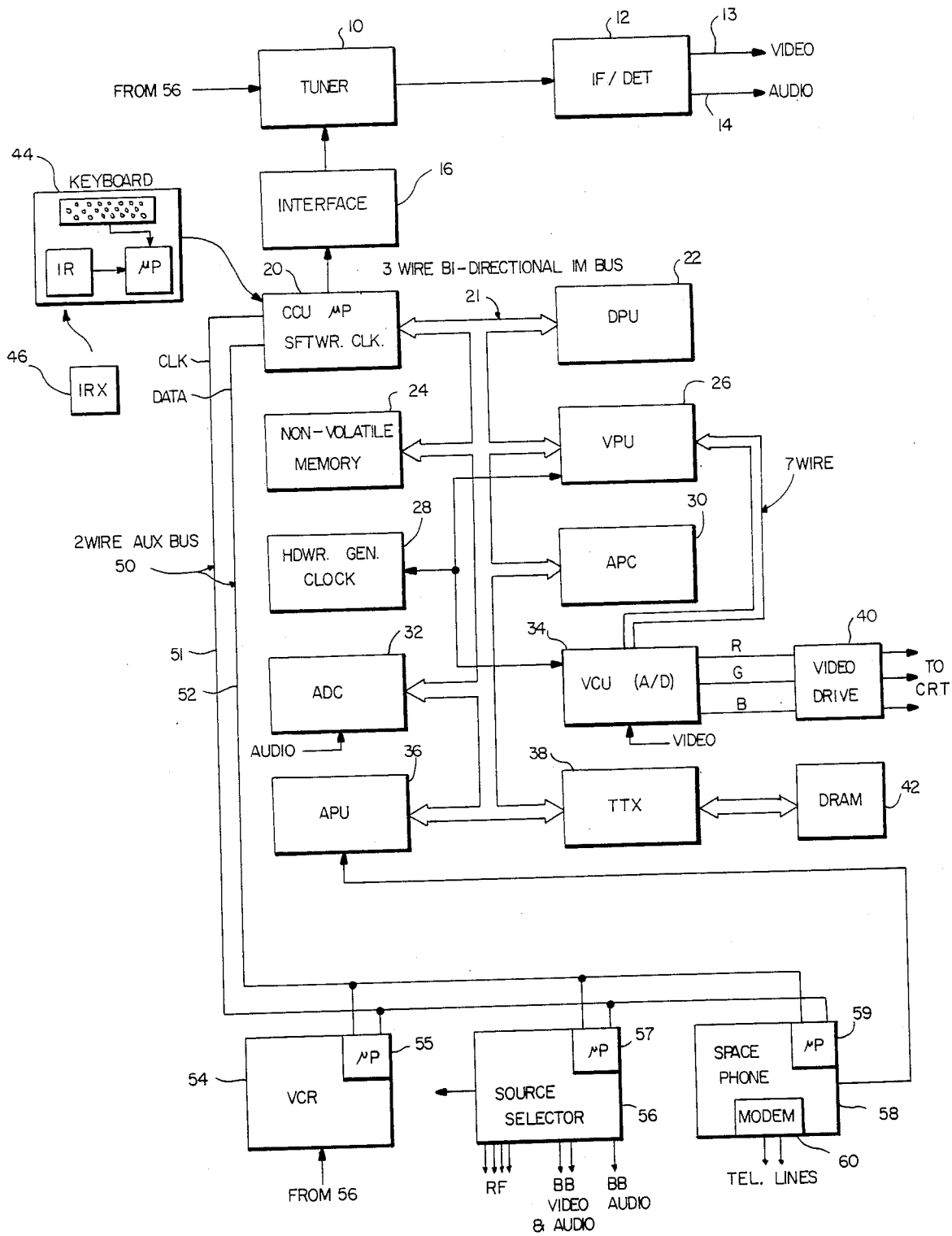

DIGITAL TV WITH LOW COST AUXILIARY DEVICE COMMUNICATION SYSTEM

BACKGROUND OF THE INVENTION AND PRIOR ART

This invention relates generally to digital television receivers and, particularly, to digital television receivers arranged for economical interfacing with a plurality of auxiliary devices.

With the proliferation of low cost microprocessors and microprocessor controlled devices, television (TV) receivers are being designed to utilize digitized signals and controls. There are many advantages associated with digital TV receivers, including uniformity of product, precise control of signal parameters and operating conditions, elimination of mechanical switches and a potential for reliability that has been heretofore unknown. Digital television receivers include a high speed communication bus for interconnecting a central control unit microprocessor (CCU) with various TV function modules for processing a TV signal. These modules include a deflection processing unit (DPU), a video processing unit (VPU), an automatic phase control (APC), a video codec unit (VCU), an audio analog to digital converter (ADC) and an audio processing unit (APU). The CCU has associated with it a non-volatile memory, a hardware-generated clock signal source and a suitable interface circuit for enabling the CCU to control processing of the TV signal throughout the various TV function modules. The received TV signal is in analog form and suitable analog to digital (A/D) converters and digital to analog (D/A) converters are provided for converting the digital and analog signals for signal processing and for reconverting them after processing for driving a cathode ray tube (CRT) and suitable speakers. The CCU microprocessor is heavily burdened because of the high speed timing required to control the various TV function modules.

To further complicate matters, modern TV receivers are increasingly being used with auxiliary devices for other than simple processing of TV signals. For example, the video cassette recorder (VCR) has enabled so-called "time-shifting" of program material by recording TV signals for later, more convenient viewing. The VCR is also extensively used with prerecorded material and with programs produced by users having access to a video camera. Other auxiliary devices providing features such as "Space Phone" whereby the user is enabled to make and receive telephone calls through his TV receiver, are desirable options. Additionally, a source selector auxiliary device enables a host of different signal sources, such as cable, over-the-air antenna, video disk, video games, etc. to be connected for use with the signal processing circuitry of the TV. In addition, all of these many auxiliary devices are preferably controllable from a remote position. A great deal of flexibility is available since each of the above auxiliary devices includes a microprocessor for internally controlling functioning of the device.

In the digital TV system described, the CCU microprocessor and the microprocessors in the auxiliary devices may be conventionally arranged to communicate over the main communication bus. Such a system would entail a specialized microprocessor with a hardware-generated clock signal in each auxiliary device in order to communicate at the high speeds used on the main communication bus. A specialized microprocessor, that is, one that is hardware configured, is significantly more expensive than an off-the-shelf microprocessor. Also, the auxiliary devices may not be required, or even desired, by all users and their low volume production cost becomes very important. It would therefore be desirable to provide a digital TV in which such auxiliary devices utilized off-the-shelf microprocessors for their control.

OBJECTS OF THE INVENTION

A principal object of the invention is to provide a novel digital TV receiver incorporating low cost auxiliary devices.

Another object of the invention is to provide a digital TV with auxiliary devices utilizing off-the-shelf microprocessors.

A further object of the invention is to provide a novel digital TV receiver having a high speed TV signal communication bus and a low speed auxiliary device communication link.

Still another object of the invention is to provide a low cost digital TV receiver and auxiliary device communication system that is totally microprocessor-based.

BRIEF DESCRIPTION OF THE DRAWING

These and other objects and advantages of the invention will be apparent upon reading the following description in conjunction with the drawings, the single FIGURE of which illustrates a block diagram of a digital TV system with auxiliary devices constructed in accordance with the invention.

DESCRIPTION OF THE PREFERRED EMBODIMENT

Referring to the drawing, a digital TV includes a tuner 10 coupled to an IF/Detector 12 which has a pair of outputs 13 and 14 supplying video and audio signals, respectively. Control signals for tuner 10 are supplied through an interface circuit 16 from a CCU microprocessor 20 which functions as a single master control unit for the system. Microprocessor 20 is interconnected by means of a bidirectional three-wire IM (Intermetal) bus 21 to a DPU 22, a VPU 26, an APC 30, a TTX (teletext processor) 38, an APU 36, an ADC 32 and a non-volatile memory 24. A serial control line 29 interconnects a hardware generated clock 28, VPU 26 and VCU 34. VPU 26 and VCU 34 are also interconnected by a seven wire cable and TTX 38 is interconnected with a DRAM 42. DRAM 42 is a dynamic RAM in which TTX information is stored for display. VCU 34 is supplied with video signal and supplies a digitized 7 bit grey coded video signal to VPU 24 for processing and RGB color signals to a Video Drive 40 which, in turn, supplies a cathode ray tube (not shown). A keyboard 44 is coupled to CCU 20 and includes an IR detector that is responsive to coded IR signals supplied from an IR transmitter (IRX) 46. A resident microprocessor in keyboard 44 decodes the received IR signals and generated control commands and supplies appropriate outputs to CCU 20. The diagram, as described, is substantially identical to that for a "DIGIT" 2000 VLSI Digital TV System developed by ITT Intermetal and published in Edition 1984/85 Order No. 6250-11-2E.

As mentioned, the three-wire IM bus 21 is a high speed bidirectional bus in which CCU 20 functions as the master and all of the interconnected TV signal processing function modules are slaves that communicate with the CCU in accordance with the protocol established for the system. CCU 20 is also indicated as including a software generated clock which supplies a two-wire auxiliary device bus 50. Two-wire bus 50 includes a clock lead 51 and a data lead 52 coupled to a plurality of auxiliary devices. A VCR 54, including an off-the-shelf microprocessor 55, is coupled to bus 50. A Source Selector 56, including an off-the-shelf microprocessor 57, is also coupled to bus 50. Source Selector 56 has access to four RF inputs, two baseband video and audio inputs and one separate baseband audio input. It will be appreciated that Source Selector 56 may have a greater or lesser number of signal sources to which it has access. Source Selector 56 outputs are coupled to VCR 54 and also to tuner 10 and supply, under control of CCU 20 and keyboard 44, the signal from the signal source selected by keyboard 44 or IR transmitter 46 for use with the digital TV. Auxiliary device bus 50 is also coupled to a Space Phone 58 which includes an off-the-shelf microprocessor 59 and a modem 60 that is connectable to a conventional telephone terminal.

Two-wire auxiliary device bus 50 is a relatively low speed bus and there is no need for separate hardware generated clock signals to be developed by the auxiliary device microprocessors. As mentioned above, this feature involves a significant savings in the cost and complexity of the auxiliary devices.

The protocol used on the two-wire auxiliary device bus consists of a 16 bit sequence, the first eight bits of which are used for bus address commands for the auxiliary devices. Each auxiliary device may respond to 16 addresses which allows the CCU to write into or read from various storage registers in the devices which are used for control or data storage. Thus, with this low cost system, as many as 16 auxiliary devices may be connected to the auxiliary device bus. The second eight bits of the 16 bit sequence contain data which is either transferred from the CCU to the auxiliary device addressed, or transferred from the auxiliary device to the CCU, based upon the bus address used. Thus, the various bus addresses to which a given auxiliary device will respond determine whether the auxiliary device will receive data from the CCU or send data to the CCU. The clock line timing, generated by software in CCU 20, is slow enough to permit software monitoring of the line and data reception by simple auxiliary device microprocessors that are not equipped with an external interrupt feature. The timing on the auxiliary device bus is made sufficiently fast to avoid too many instruction steps or the need for special registers in CCU 20. In the system described, data is clocked every 82.5 microseconds, thus permitting a 16 bit word to be clocked in 1.32 milliseconds. A pause of 277.5 microseconds between the first 8 bits and the second 8 bits permits the slave auxiliary device to process the bus address data contained in the first 8 bits. This timing fits into the 2 millisecond timing block structure used for the CCU in controlling the DIGIT 2000 digital TV. Two-2 millisecond timing blocks have been established in the CCU, which has a 20 millisecond timing loop divided into ten-2 millisecond timing blocks. Thus, two control words may be sent to an auxiliary device every 20 milliseconds, or a request by the CCU to receive data and the actual receipt of that data may take place in that time period.

With the system of the invention, the CCU is unburdened in the sense that it efficiently communicates with the auxiliary devices in a manner that utilizes the fewest number of interconnections. Thus, the major CCU burden is imposed by the three-wire IM bus in the digital TV. Further, the auxiliary devices may include off-the-shelf low cost microprocessor controllers that need not include any specialized hardware.

What has been described is a novel digital television system that is readily connected with a plurality of auxiliary devices that include simple microprocessor controllers. It is recognized that numerous changes in the described embodiment of the invention will be apparent to those skilled in the art without departing from its true spirit and scope. The invention is to be limited only as defined in the claims.

What is claimed is:
1. A digital television system comprising:
   a high speed microprocessor controller including means for producing a high speed hardware generated clock signal and means for producing a low speed software generated clock signal;
   a plurality of television function modules for performing a plurality of television signal processing functions;
   a plurality of auxiliary devices for performing functions ancillary to said television signal processing, each of said auxiliary devices including a standard off-the-shelf microprocessor including means for responding to software generated clock signals;
   a high speed communication bus linking said microprocessor controller and the high speed hardware generated clock signal with said plurality of television function modules for enabling control of the operation of said modules;
   a low speed communication link interconnecting said microprocessor controller and the low speed software generated clock signal with each of said microprocessors in said auxiliary devices; and
   the microprocessor in each of said auxiliary devices being in a slave relationship to said microprocessor controller and performing as data communication devices.

2. The system of claim 1 wherein said low speed communication link comprises a two-wire auxiliary device bus.

3. The system of claim 2 wherein said auxiliary devices comprise a video cassette recorder and a signal source selector.

4. The system of claim 3 wherein one of said wires in said two wire auxiliary device bus carries said software generated clock signal from said microprocessor controller and the other of said wires in said two-wire auxiliary device bus carries bidirectional data in 16 bit sequences with the first eight bits containing bus address and command information for the auxiliary devices and the second eight bits containing data that is transferred between said microprocessor controller and the auxiliary devices.

5. The system of claim 4 wherein each auxiliary device is capable of responding to 16 addresses generated by the microprocessor controller and wherein each auxiliary device includes means for providing information to or receiving information from said microprocessor controller.

6. The system of claim 5 wherein the timing of the clock signal generated by said microprocessor controller and applied to said clock wire is sufficiently slow to permit software monitoring and data reception by the microprocessor in said auxiliary devices, without the need for hardware generated clock signals.

7. A digital television system comprising:
 a high speed microprocessor controller including means for producing a high speed hardware generated clock signal and means for producing a low speed software generated clock signal;
 a plurality of television function modules for performing a plurality of television signal processing functions;
 a plurality of auxiliary devices for performing functions ancillary to said television signal processing, each of said auxiliary devices including a standard off-the-shelf microprocessor including means for responding to software generated clock signals;
 a high speed communication bus linking said microprocessor controller and the high speed hardware generated clock signal with said plurality of television function modules for enabling control of the operation of said modules;
 a two-wire low speed communication link interconnecting said microprocessor controller and the low speed software generated clock signal with each of said microprocessors in said auxiliary devices; and
 one of said wires in said two-wire auxiliary device bus carrying said software generated clock signal from said microprocessor controller and the other of said wires in said two-wire auxiliary device bus carrying bidirectional data in 16 bit sequences with the first eight bits containing bus address and command information for the auxiliary devices and the second eight bits containing data that is transferred between said microprocessor controller and the auxiliary devices; and
 the microprocessor in each of said auxiliary devices being in a slave relationship to said microprocessor controller and performing as data communication devices.

8. The system of claim 7 wherein said auxiliary devices comprise a video cassette recorder and a signal source selector and wherein each said auxiliary device is capable of responding to 16 addresses generated by the microprocessor controller, each said auxiliary device further including means for providing information to or receiving information from said microprocessor controller.

* * * * *